United States Patent [19]
Yamin

[11] Patent Number: 4,752,227
[45] Date of Patent: Jun. 21, 1988

[54] EDUCATIONAL GAME AND METHOD OF PLAYING THE GAME

[76] Inventor: Lisa E. Yamin, 3222 Greenmead Rd., Baltimore, Md. 21207

[21] Appl. No.: 16,727

[22] Filed: Feb. 19, 1987

[51] Int. Cl.$^4$ ............................................. G09B 19/18
[52] U.S. Cl. .................................... 434/110; 273/273; 273/282
[58] Field of Search ............ 273/236, 269, 273, 282 C; 434/110, 195, 196, 200, 208

[56] References Cited

U.S. PATENT DOCUMENTS

| | | |
|---|---|---|
| 462,376 | 11/1891 | Cowan . |
| 873,031 | 12/1907 | Doan et al. ...................... 273/282 C |
| 1,526,597 | 2/1925 | Harris .................................... 273/303 |
| 1,836,870 | 12/1931 | Quer . |
| 2,244,921 | 6/1941 | Roth ...................................... 273/273 |
| 2,502,238 | 3/1950 | Wade et al. . |
| 2,950,542 | 8/1960 | Steelman . |
| 3,251,600 | 5/1966 | Warnberg ...................... 273/282 C |
| 3,488,864 | 1/1970 | McManus . |
| 3,690,017 | 9/1972 | Holmquist . |
| 3,749,404 | 7/1973 | Oetzel ................................. 273/269 |
| 4,571,189 | 2/1986 | Shank . |

FOREIGN PATENT DOCUMENTS 2321677 11/1974 Fed. Rep. of Germany .

Primary Examiner—Anton O. Oechsle
Attorney, Agent, or Firm—Roylance, Abrams, Berdo & Goodman

[57] ABSTRACT

An educational game including a game board. The game board is a sheet of material having top and bottom surfaces. Each of the surfaces has a plurality of circular recesses therein. The recesses are of a number of predetermined diameters slightly larger than the diameters of various coin denominations. The top surface of the sheet is divided into a number of sub-areas. Each sub-area is divided into first and second portions and all the portions include at least one of the recesses. The first portion of each sub-area includes recesses having diameters which are slightly larger than the diameters of coins summing a certain monetary value. Each second portion of every sub-area includes recesses having diameters slightly larger than the diameters of coins which also total the certain monetary value. This teaches the equivalency of coins since, in all the sub-areas, the coins in the first portion are equal in value to the coins in the second portion. The bottom surface is played by selecting a monetary value and placing coins in the appropriate recesses which sum the monetary value.

15 Claims, 3 Drawing Sheets

EDUCATIONAL GAME AND METHOD OF PLAYING THE GAME

FIELD OF THE INVENTION

This invention relates to educational games involving the skills of handling money and methods of playing such games. More particularly, this invention relates to educational games for learning the relative values of coins and paper currency.

BACKGROUND OF THE INVENTION

An important but sometimes difficult skill for children or persons with learning disabilities to learn and master is the skill of counting money, including the ability to count change in coins.

The gaining and mastering of this skill allows children or persons with learning disabilities to function in society with less concern and supervision. That is, if a parent or a person responsible for a person with a learning disability is assured that that child or disabled person can make his or her own purchases, and take care of himself or herself in situations involving the use of money, the parent or responsible person will permit the child or disabled person to venture further by himself or herself.

Also, the mastering of this skill allows children or disabled persons to gain more mobility since, for example, they can count the change necessary to take public transportation, they know the correct change to put into a pay telephone, etc.

Moreover, with respect to persons with learning disabilities, the ability to properly handle coin and paper currency may lead to job opportunities for that disabled person. For example, if a person has a learning disability, but he or she is able to count change, he or she may be able to get a job as a cashier, a store clerk. etc. This is particularly important if the person has a further disability which impedes his or her working abilities, such as being confined to a wheelchair. Therefore, the handling of money is a very important skill for persons with learning disabilities to acquire and master.

Unfortunately, the ability to properly handle currency, and in particular, coins, is frequently difficult to learn since the relative values of the coins are difficult to comprehend. In fact, confronting a person with a learning disability with the relative values of coins can be so confusing and so overwhelming that the person is too scared to attempt to learn.

Devices have been developed which attempt to teach children and persons with learning disabilities the relative values of coin currency, see German Pat. No. 2,321,677 issued on Nov. 21, 1974; U.S. Pat. Nos. 3,488,864 issued on Jan. 13, 1970 to McManus; 3,690,017 issued on Sept. 12, 1972 to Holmquist and 4,571,189 issued on Feb. 18, 1986 to Shank. However, none of these devices effectively teach the relative values of coins and what combination of coins comprise arbitrary monetary values.

In addition, games have been developed for teaching basic arithmetic skills. Examples of such games are disclosed in U.S. Pat. Nos. 462,376 issued to Cowan on Nov. 3, 1891; 1,836,870 issued to Quer on Dec. 15, 1931; 2,502,238 issued to Wade et al. on Mar. 28, 1950 and 2,950,542 issued to Steelman on Aug. 30, 1960. These devices may be effective for teaching the arithmetic skills of addition and subtraction, however, they fail to teach the relative values of coins and the proper employment of these coins to derive arbitrary monetary values. Indeed, children or persons with learning disabilities may not be able to correlate numbers with coins. Therefore, these games which teach arithmetic skills do not necessarily teach a child or a person with a learning disability coin values.

In view of the above, it is apparent that there is an important need for an educational device, preferably a game, which can be employed to teach children and persons with learning disabilities how to properly handle coins and paper currency, including teaching them the relative values of different coins and how to compile the proper coins to sum any monetary value.

This invention addresses this need, along with other needs which will become apparent to those skilled in the art once given this disclosure.

SUMMARY OF THE INVENTION

This invention provides a game for teaching children and persons with learning disabilities the relative values of coin denominations of a currency. The game includes a game board which is a sheet of material having a top surface with a plurality of circular recesses therein. The recesses are of a number of predetermined diameters, the predetermined diameters being slightly larger than the diameters of various coin denominations of a currency. The top surface is also divided into a number of sub-areas. Each of these sub-areas includes a first and a second portion. Each such portion includes at least one of the recesses. The first portion of every sub-area includes at least one recess having a diameter which is slightly larger than the diameter of a coin. The second portion of each sub-area includes recesses having diameters which are slightly larger than the diameters of coins totalling the monetary value of the coin received in the recess in the first portion. Thus, when the recesses of the first and second portions are filled with the proper coins, the monetary value of the coin(s) received in each first portion will equal the monetary value of the coins received in each corresponding second portion.

In some embodiments of the invention, the first portion of the sub-areas only includes one of the recesses. In these embodiments, the second portion contains recesses for coins which would add up to the value of the coin received in the single recess in the first portion.

In some embodiments of this invention, the material is rigid. Examples of such rigid materials which can be employed are plastics and wood.

In yet other embodiments of this invention, the top surface may include other sub-areas having first and second portions. The first portions of these other sub-areas may include a representation of, or recess to receive, paper currency, or a facsimile thereof. The second portion of these other sub-areas include recesses having diameters slightly larger than the diameters of coins which add up to the value of the paper currency.

In some embodiments of the invention, the sub-areas may be arranged in series such that the person playing the game follows the series of sub-areas to complete the game.

In yet other embodiments of the invention, the sheet also has a bottom surface which includes a plurality of the recesses discussed above therein. The recesses in the bottom surface may be arranged in at least one set of rows with each row including recesses of the same diameter, but each row within the set having different diameter recesses. The bottom surface may include at least two sub-areas which include identical sets of the row of recesses so that two or more persons may play the game at the same time.

In further embodiments of the invention, a set of cards may be provided with the game for use with the bottom surface. This set may include a number of cards each having a monetary value indicated thereon.

The method of playing the game provided by the top surface of the game board is very simple, since the game is intended for use by children and learning disabled persons. The "play" comprises placing the proper coins in all of the recesses in the top surface. By doing so, the player will learn the relative values of the various coins since for each sub-area, the value of the coins in the first portion equals the value of the coins in the second portion.

The bottom surface of the game board is employed by displaying one of the cards of the card set. The player(s) then attempts to place the fewest number of coins in the recesses which add up to the displayed monetary value. Use of the bottom surface requires more, mentally, of the "players" and is designed to develop stronger skills. Thus, the top surface is used as a beginners game and the bottom surface as a more advanced teaching aid. This double thrust adds great versatility and corresponding advantages to the invention.

This educational game has many advantages over other educational games having similar objectives.

First, the game effectively teaches children and persons with learning disabilities the relative values of coins and paper currency and also which combinations of coins sum arbitrary monetary values, with emphasis on using the fewest number of coins to sum the monetary values. The game's effectiveness is enhanced since real coins are preferably employed to play the game. This use of real coins gives the players "hands-on experience" with coins.

Another advantage is that the game develops the dexterity and the eye-hand coordination of the persons playing it. When playing the game, coins must be placed in the various recesses, and at the end of the game, the coins must be removed from the various recesses. Since the recesses are only slightly larger than the coins, finger dexterity is required to place and remove coins from the recesses. Also, of course, eye-hand coordination is involved to place the proper coins in the recesses.

Furthermore, the game can be employed to teach blind persons monetary skills.

Another advantage is that the game can be employed to teach people of foreign countries a new currency system. In addition, the game can be employed to teach foreign currency exchange equivalents. For example, the coins received in the first portions could be from one country's currency, and the coins received in the corresponding second portion could be from another country's currency. The monetary value of the first and second portions would be equal. Thus, the use of the game could teach persons new currency systems and foreign currency exchanges without language barriers, since verbal skills are not necessary to play the game. The only "rule" needed to be understood to play the game is that the values of the coins in the two portions are equal. Once that is understood, the game is self-teaching. That one "rule" is usually self-evident to teachers and other adults upon first sight of the invention "game".

Yet another advantage of games according to this invention is that the child or disabled person playing the games can proceed at his or her own pace. The games can be played with no competitive aspects. Therefore, a child or disabled person will be free to learn at the pace he or she desires, without fear of ridicule for being slower than others in his or her peer group.

A further advantages of this invention is that the game can be played by a child by himself or herself if the child is without playmates. In the alternative, however, the game can be played in groups, and the playing of the game can be a group effort. Therefore, the game can be employed in all types of environments, for example at home, at school, in day care centers or play groups. Competitive aspects, such as racing against time or each other, and the like, are easily introduced.

Certain embodiments of this invention will now be described with respect to the drawings also forming a part of this disclosure, and in which:

DETAILED DESCRIPTION OF THE FIGURES

One embodiment of an educational game according to this invention is disclosed in FIGS. 1-6. This game includes game board 10 having top surface 12 (see FIG. 1) and bottom surface 14 (see FIG. 2).

In the embodiment illustrated in FIGS. 1-6, game board 10 is made of a rigid plastic material. It is understood that the game can be made of any rigid material, such as wood, or that game board 10 can even be comprised of a flexible material, if desired. Game board 10 is comprised of one sheet of material having a uniform thickness.

Top surface 12 is separated into various sub-areas, including sub-areas 16-33.

Figure 1:
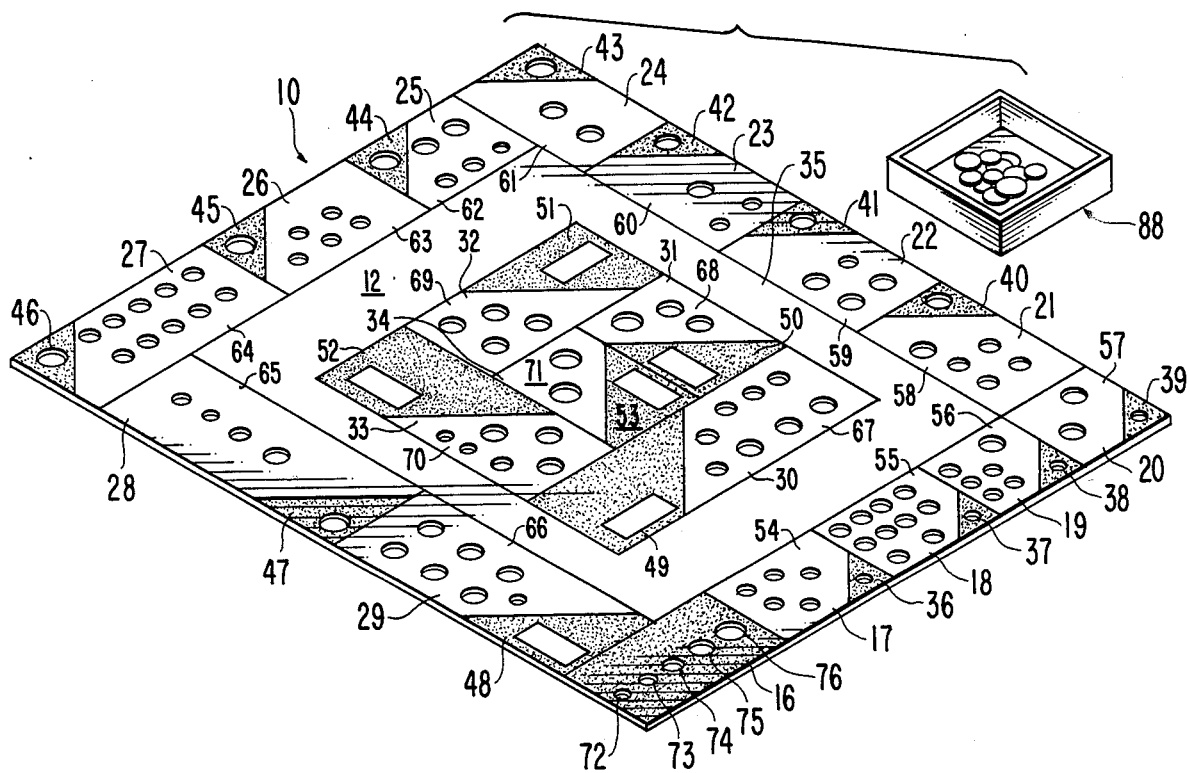
FIG. 1 is a perspective view of the top surface of a game board and a coin box of one embodiment on this invention.

Sub-areas 16-29 form a perimeter along the edge of top surface 12 (see FIG. 1). This perimeter of sub-areas is separated from a middle section of sub-areas (formed by sub-areas 30-34) by border area 35. Border area 35 may also be employed as space to print any trademarks, game instructions or other matter as desired on the face of top surface 12.

Sub-areas 16-29 are illustrated in direct contact along their edges. Likewise, the adjacent edges of sub-areas 30-34 are in contact. If desired, space could be provided between the adjacent sub-areas.

Each of the sub-areas 17-34 is divided into two portions. Therefore, as shown in FIG. 1, sub-areas 17-34 include first portions 36-53 and second portions 54-71, respectively. That is, sub-areas 17 includes first portion 36 and second portion 54, sub-area 18 includes first portion 27 and second portion 55, etc.

Sub-areas 16–34 may be distinguished from border area 35 and other areas of top surface 12 by differences in color, lines drawn on top surface 12, striping, dotting, shading, ridges, recesses, etc. Likewise, first portions 36–53 can be distinguished from second portions 54–71 within sub-areas 16–34 by the same means. For example, if game board 10 is made of wood, first portions 36–53 could be painted black, second portions 54–71 could be painted red and the remaining areas of top surface 12 painted yet another color. Lines could be painted on top surface 12 to distinguish the various sub-areas.

Addressing the individual sub-areas, sub-area 16 is the starting point for the game. Sub-area 16 has five recesses 72–76 therein. The recesses 72–76 have diameters slightly larger than the diameters of the coin denominations of the U.S. currency, in increasing value. That is, recess 72 is slightly larger than the diameter of a penny, recess 73 is slightly larger than the diameter of a nickel, recess 74 is slightly larger than the diameter of a dime, recess 75 is slightly larger than the diameter of a quarter, and recess 76 is slightly larger in diameter than the diameter of a U.S. half-dollar piece.

The remaining sub-areas, sub-areas 17–34, are employed to teach the relative values of U.S. coin and paper currency.

Sub-areas 17–34 each include a plurality of recesses having diameters slightly larger than one of the U.S. coin denominations. In this embodiment, each first portion 36–53 has either a single recess to receive a single coin therein or has a representation of a U.S. one dollar bill imprinted thereon. Second portions 54–71 of sub-areas 17–34 include recesses to receive coins equal in value to the coin received in first portions 36–47 or equal to one dollar (for first portions 48–53). Thus, when all of the recesses in top surface 12 are filled with coins, all of the coins received in second portions 54–71 are equal in monetary value to the coins in the corresponding first portions, for first portions 36–47, or to one dollar, for first portions 48–53.

While this embodiment illustrates first portions only having single recesses or a representation of a one dollar bill, in other embodiments, the first portions could have more than one recess therein. For example, a first portion could have recesses to receive two quarters, and the second portion corresponding to the first portion could have recesses to receive five dimes.

Furthermore, in other embodiments of this invention, first portions 48–53 could include recesses to receive actual one dollar bills instead of having representations of one dollar bills imprinted thereon. As a further alternative, "play" dollar bills (plastic, wood or paper) could be employed in place of real one dollar bills.

Turning to sub-areas 17–34 in detail, first portion 36 of sub-area 17 has a recess therein which receives a nickel. Second portion 54 has five recesses therein, each of which receives a penny. In sub-area 18, first portion 37 has a recess therein which receives a dime. Second portion 55 has ten recesses therein, each of which receives a penny. In sub-area 19, first portion 38 has a recess therein which receives a dime. Second portion 56 has one recess therein which receives a nickel and five recesses which receive pennies. In sub-area 20, first portion 39 has a recess therein which receives a dime. Second portion 57 has two recesses therein, each of which receives a nickel.

In sub-area 21, first portion 40 has a recess therein which receives a quarter. Second portion 58 has five recesses therein, each of which receives a nickel. In sub-area 22, first portion 41 has a recess therein which receives a quarter. Second portion 59 has a recess therein which receives a dime and three recesses which receive nickels. In sub-areas 23, first portion 42 has a recess therein which receives a quarter. Second portion 60 has one recess therein which receives a nickel and two recesses which receive dimes.

In sub-area 24, first portion 43 has a recess therein which receives a fifty cent piece. Second portion 61 has two recesses therein, each of which receive a quarter. In sub-area 25, first portion 44 has a recess therein which receives a half-dollar piece. Second portion 62 has a recess therein which receives a quarter, a recess which receives a dime, and three recesses which receive nickels. In sub-area 26, first portion 45 has a recess therein which receives a half-dollar. Second portion 63 has five recesses therein, each of which receives a dime. In sub-area 27, first portion 46 includes a recess which receives a half-dollar. Second portion 64 has ten recesses therein, each of which receives a nickel. In sub-area 28, first portion 47 has a recess therein which receives a half-dollar. Second portion 65 has one recess therein which receives a quarter, one recess which receives a nickel and two recesses which receive dimes.

In sub-area 29, first portion 48 includes a representation of a one dollar bill. Second portion 66 has three recesses therein which receive quarters, three recesses which receive nickels and one recess which receives a dime. In sub-area 30, first portion 49 includes a representation of a dollar bill. Second portion 67 has three recesses therein which receive quarters and five recesses which receive nickels. In sub-area 31, first portion 50 includes a representation of a one dollar bill. Second portion 68 has a recess therein which receives a half-dollar piece and two recesses which receive quarters. In sub-area 32, first portion 51 includes a representation of a one dollar bill. Second portion 69 has four recesses therein, each of which receives a quarter. In sub-area 33, first portion 52 includes a representation of a one dollar bill. Second portion 70 has three recesses therein which receive quarters, two recesses which receive dimes and one recess which receives a nickel.

In sub-area 34, first portion 53 includes a representation of a one dollar bill. Second portion 71 has two recesses therein, each of which receive a fifty cent piece.

In this embodiment, as discussed above, the representations of one dollar bills on first portions 48–53 comprise painted or carved insignia. In other embodiments of this invention, recesses may be provided in first portions 48–53 for receiving actual one dollar bills, or for receiving "play" one dollar bills, such that actual one dollar bills do not have to be employed to play the game. In the alternative, plastic or other pieces representing dollar bills could be employed.

Likewise, with respect to the coins, actual coins do not have to be used to play the game. Replicas of actual coins could be employed as desired. Such replicas could be of size different from actual coins, however, replicas of the same size are preferred, and real coins are the most preferred.

Bottom surface 14 includes four sub-areas 77–80. In the embodiment illustrated in FIG. 2, sub-areas 77–80 are identical. As with the sub-areas on top surface 12, sub-areas 77–80 can be distinguished from the other areas of bottom surface 14 by color, outlines, striping, dotting, ridges, recesses or by any other such means.

Each sub-area 77–80 includes rows of recesses, each row being comprised of recesses having the same diameter, but no two rows include recesses of the same diameter. The diameters of the recesses are slightly larger than the diameters of the different denomination of U.S. coin currency, the same as the recesses in top surface 12.

Taking sub-area 77 as an example, it has five rows of recesses therein. The first row is formed by two recesses 81, each having a diameter slightly larger than the diameter of the U.S. half-dollar piece. The second row is comprised of four recesses 82, each having a diameter slightly larger than the diameter of a quarter. The third row is comprised of five recesses 83, each having a diameter slightly larger than the diameter of a dime. The fourth row is comprised of five recesses 84, each having a diameter slightly larger than the diameter of a nickel. The fifth row is comprised of five recesses 85, each having a diameter slightly larger than the diameter of a penny.

Bottom surface 14 also has a coin area 86 in the approximate center thereof. Coin area 86 is distinguished from the remaining portions of bottom surface 14 by different colors, by outlines or by any other such means. Coin area 86 is designed to temporarily receive coins therein which may be employed to play the game. The coins can be placed directly in coin area 86, or in the alternative, a coin box such as coin box 88 (illustrated in FIG. 1 and discussed below) can be placed in the coin area 86. If desired, coin area 86 may be recessed.

Bottom surface 14 also includes value card area 87 and an answer card area (not shown). The answer card area is not shown in FIG. 2 since it is covered by answer card set 89 (see discussion below). Value card area 87 is of a size and shape such that the value cards (discussed below) can be placed thereon. The answer card area is likewise designed such that the answer cards can be placed thereon. Value card area 87 and the answer card area are located on opposite sides of coin area 86, as shown in FIG. 2.

The embodiment of the invention illustrated in the Figures also includes coin box 88, as shown in FIG. 1. In this embodiment, coin box 88 is an open topped box having four sides and a bottom.

Figure 2:
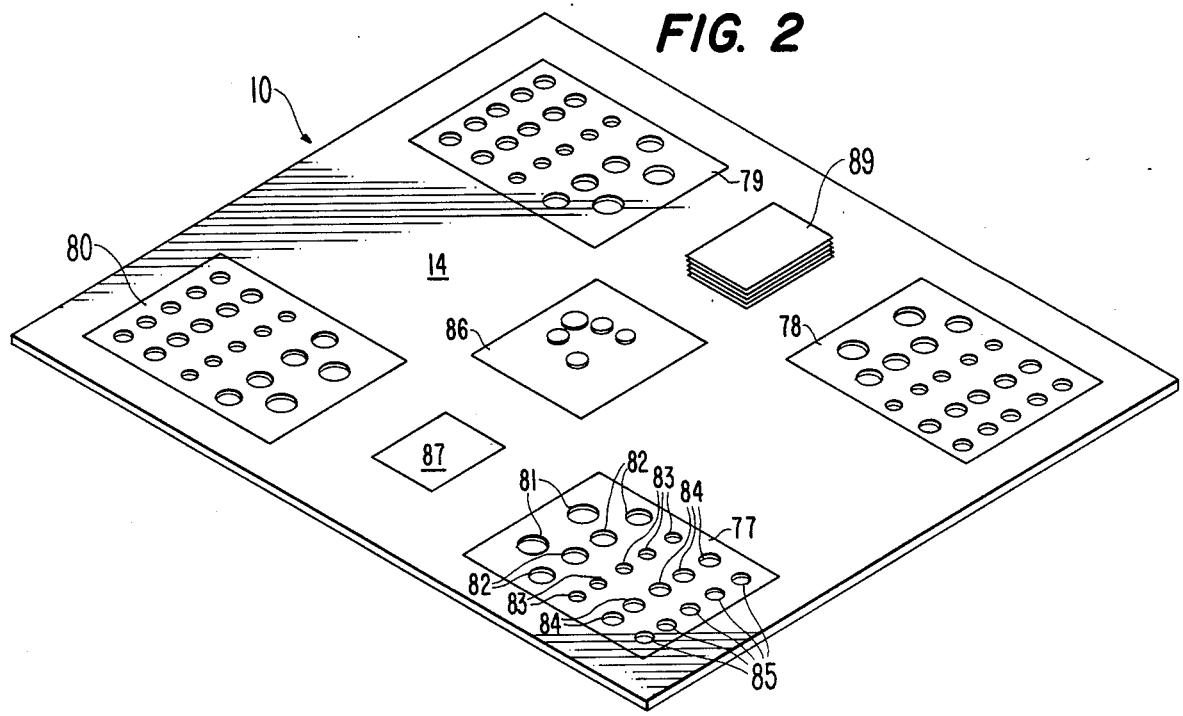
FIG. 2 is a perspective view of the bottom surface of the game board illustrated in FIG. 1 and of a card set which may be included in this embodiment of the invention.
Figure 3:
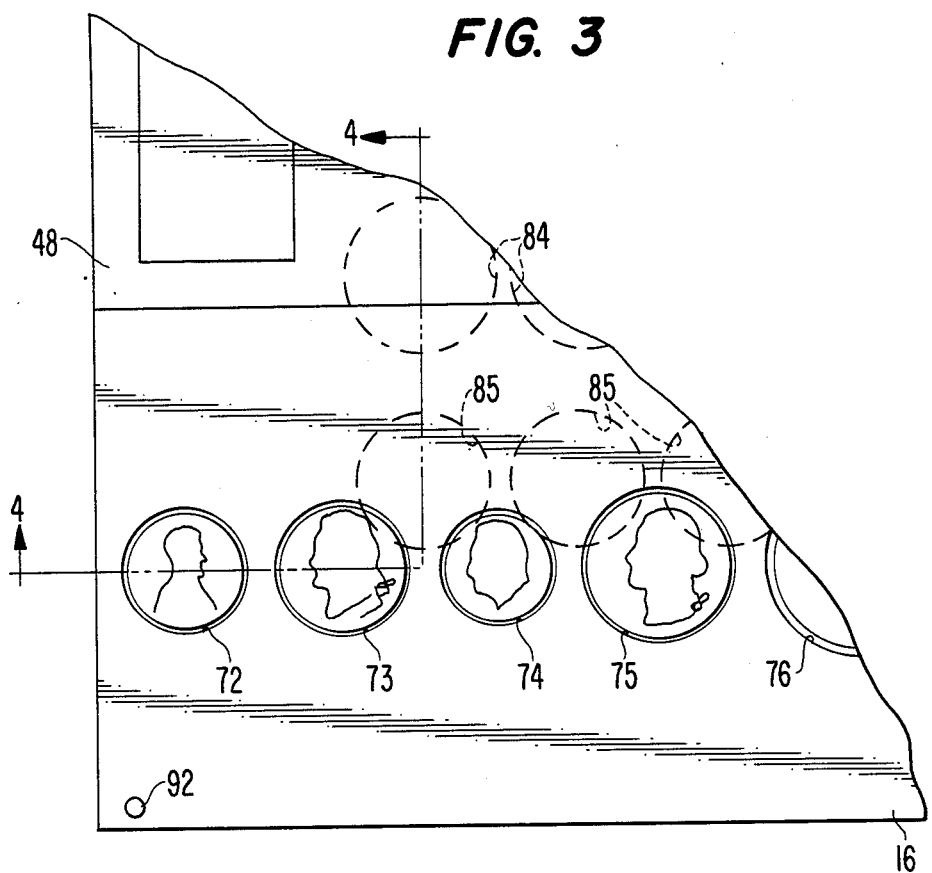
FIG. 3 is an enlarged top view of one corner of the game board illustrated in FIGS. 1 and 2.
Figure 4:
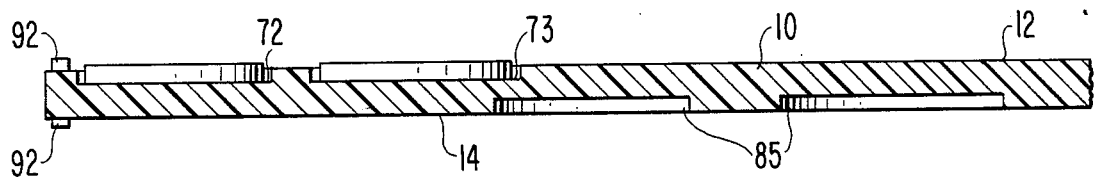
FIG. 4 is a cross-sectional view taken along line 4—4 of FIG. 3.

In addition, this embodiment includes a set of value cards (not shown) and a set of answer cards, set 89, FIG. 2.

Figure 5:
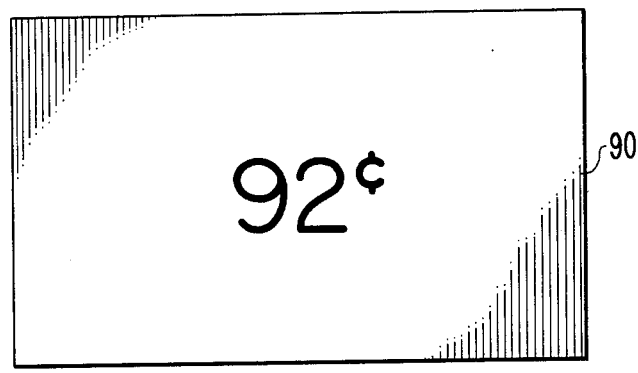
FIG. 5 is a top view of one of the cards of a value card set which can be included with the embodiment of this invention illustrated in FIGS. 1-4.

The set of value cards is comprised of a plurality of cards, each having a monetary value indicated thereon. An example of such a card is illustrated in FIG. 5, card 90, which has the monetary value "92¢" imprinted thereon. Other value cards have other monetary values imprinted thereon.

Figure 6:
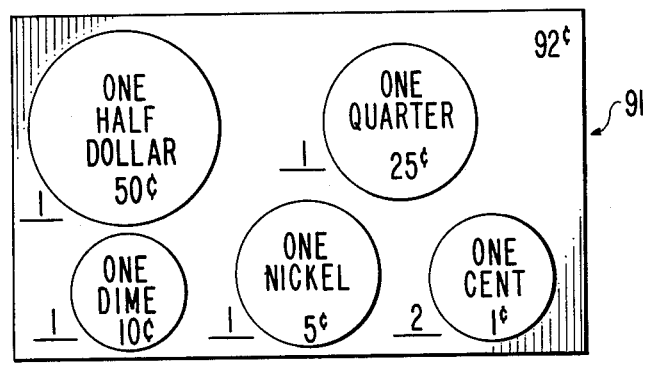
FIG. 6 is a top view of one of the cards of an answer a card set which can be included with the embodiment of this invention illustrated in FIGS. 1-5.

FIG. 6 illustrates an example of an answer card, card 91. Each answer card sets forth the combination of coins involving the least number of coins which equal a monetary value. For purposes of illustration, answer card 91 corresponds to value card 90, that is, each one is for 92¢. Answer card 91 sets forth that the combination of coins for the monetary value of 92¢ which involves the least number of coins is one half dollar piece, one quarter, one dime, one nickel and two pennies.

There is an answer card for each value card; that is, for each value card setting forth a monetary value, there is a corresponding answer card setting forth the correct combination of coins which sum the monetary value indicated on the value card.

In addition, game board 10 can be provided with rubber feet at all four corners of game board 10, on each surface 12 and 14 of game board 10. For example, see rubber feet 92 in FIGS. 3 and 4. Rubber feet 92 can be provided to protect the side of game board 10 which is face down and not in use, and also to prevent game board 10 from sliding if the game is being played on a smooth surface.

In other embodiments of this invention, game board 10 can be in effect divided into two game boards. That is, bottom surface 14 can be provided on a separate game board from top surface 12. In yet other embodiments, the recesses may have a depth equal to the thicknesses of the coins received therein.

Figure 7:
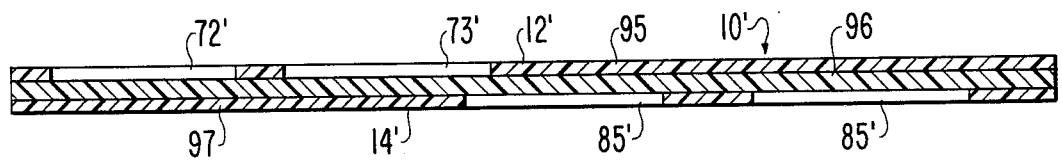
FIG. 7 is a partial cross sectional view of another embodiment of another game board according to this invention, corresponding to FIG. 4.

FIG. 7 illustrates another embodiment of this invention, game board 10'. Game board 10' is comprised of three layers, top layer 95, base layer 96 and bottom layer 97. Layers 95–97 are attached face-to-face, as illustrated in FIG. 7, and can be comprised of plastic, wood or similar materials, and combinations thereof.

Top layer 95 includes top surface 12' which is the same as top surface 12. Recesses 72' and 73' (which are identical to recesses 72 and 73) are formed by holes extending through top layer 95.

Likewise, bottom layer 97 includes bottom surface 14' which is the same as bottom surface 14. Recesses 85' are formed by holes extending through bottom layer 97.

Base layer 96 is a sheet of material having a uniform thickness.

In some embodiments of this invention, equivalents of recesses may be employed on surfaces 12 and 14 in place of the recesses. For example, the recesses could be replaced by receptacles which extend above surfaces 12 and 14. Likewise, outlines of coins could be provided, with surfaces 12 and 14 being flat.

METHODS OF PLAY

Turning first to top surface 12, at the beginning, all of the recesses in top surface 12 are empty. Various coins may be placed in coin box 88 if desired. These coins may then be taken from coin box 88 and placed in the appropriate recesses at the game is played.

One may then begin the game by placing one of each of the U.S. coin denominations into recesses 72–76, in increasing value. That is, one places a penny in recess 72, a nickel in recess 73, a dime in recess 74, a quarter in recess 75 and a half-dollar piece in recess 76.

One then proceeds counterclockwise around board area 35, proceeding next to sub-area 17. In sub-area 17, the player places a nickel in the recess in first portion 36. The person then places five pennies in the five recesses in second portion 54. A person proceeds to place the proper coins in all the recesses in sub-areas 18–34, as discussed above.

Also as discussed above, top surface 12 can be played either individually or as a group effort.

Turning to bottom surface 14, the game is begun with all of the recesses empty. Moreover, all of the value cards and the answer cards are placed face down on the board, with the value cards being in value card area 87 and the answer cards stacked on the answer card area of bottom surface 14. The cards in the respective card sets are arranged in corresponding sequence, that is, the top cards in each respective set are for the same monetary value, the second cards in each respective set are for the same monetary value, etc. A number of each denomination of U.S. coin currency is placed in coin area 86.

The game starts by turning over the top value card from the value card set. The player who turns the card over can either choose to fill in the recesses in one of the sub-areas 77–80 with coins which sum the monetary value on the value card, or he or she can challenge a playmate to do the same if a playmate is playing with the person who turned the card over. In the alternative, one to four persons (possibly including the person who turned the value card over) can attempt to place the appropriate coins in the recesses provided in sub-areas 77–80. That is, for each sub-area 77–80 a person can be attempting to place coins which sum the monetary value indicated on the card into the appropriate recesses. After the player(s) has completed his or her effort, the top answer card is turned over. The player then compares his or her efforts with the appropriate answer card. If the player's selection of coins matches the answer card, he or she may receive one point. If any playmates were participating at the same time and matched the answer card, they likewise would receive a point. The person with the most points after the card decks have been gone through would win the game.

Of course, these are only suggestions, many variations of methods are possible as to play surfaces 12 and 14 of game board 10, and will present themselves to persons using the invention, especially teachers of young children and/or the learning disabled.

Many other embodiments, modifications and improvements of this invention will become apparent to those skilled in the art once given this disclosure. Such other embodiments, modifications and improvements are considered to be within the scope of this invention as defined by the following claims.

I claim:

1. A game board comprising:
   a sheet of material having a surface with a plurality of recesses therein;
   said recesses being of a number of predetermined diameters, said predetermined diameters being slightly larger than the diameters of various coins;
   said surface including a number of sub-areas;
   said sub-areas including first and second portions, each said portion including at least one of said recesses; and
   wherein said first portion of every said sub-area includes at least one said recess, and said second portion of every sub-area includes a plurality of said recesses having diameters which are slightly larger than the diameters of coins totalling the monetary value of said coin received in said first portion.

2. A game board according to claim 1 wherein said first portions include only one said recess.

3. A game board according to claim 1 wherein said material is rigid.

4. A game board according to claim 3 wherein said sheet of material is comprised of at least two layers attached face-to-face, said sub-areas comprising a first of said layers.

5. A game board according to claim 4 wherein said recesses are holes through said first layer.

6. A game board according to claim 1 wherein said top surface includes other sub-areas having first and second portions,
   said first portion of said other sub-areas including a designation of a specific paper currency;
   said second portion of said other sub-areas including recesses having diameters slightly larger than the diameters of coins which sum the monetary value of the paper currency.

7. A game board according to claim 1 wherein said sheet has a bottom surface;
   said bottom surface having a plurality of said recesses therein;
   said recesses in said bottom surface being arranged in rows;
   each said row is comprised of recesses of the same diameter each said row having recesses of a different diameter than the other said rows.

8. A game board according to claim 1 wherein a plurality of said sub-areas are arranged in series.

9. A game board according to claim 8 wherein said series of said sub-areas extends along the perimeter of said game board.

10. A game board according to claim 1 wherein said recesses have a depth approximately equal to the thickness of the coins which are received within said recesses.

11. A game board comprising:
    a sheet of material having top and bottom surfaces, each said surface having a plurality of circular recesses therein;
    said recesses being of a number of predetermined diameters, said predetermined diameters being slightly larger than the diameters of various coins;
    said top surface including a number of sub-areas;
    each said sub-area including first and second portions, each said portion including at least one of said recesses;
    wherein said first portion of every said sub-area includes at least one said recess, said second portion of every sub-area includes a plurality of said recesses having diameters which are slightly larger than the diameters of coin totalling the monetary value of said coin received in said first portion;
    said recesses in said bottom surface being arranged in rows with all the recesses in a row having the same diameter.

12. A game board according to claim 11 wherein said sheet of material is comprised of layers of material;
    said top surface comprising a first of said layers and said bottom surface comprising a second of said layers;
    said recesses being formed by holes through said first and second layers.

13. A method of playing a game comprising the steps of
    providing a game board comprised of:
    a sheet of material,
    said sheet having a top surface with a number of circular recesses therein,
    said recesses having diameters slightly larger than the diameters of coins of a currency, and
    said recesses being arranged in rows with all the recesses in a row having the same diameter;
    providing a first card set containing a plurality of cards, each said card having a monetary value indicated thereon;
    displaying one of said cards such that said monetary value is visible; and
    placing coins in said recesses which equal the visible monetary value.

14. A method according to claim 13 wherein the step of providing a game board includes the game board being divided into sub-areas, each sub-area having a set of said rows of said recesses therein; and further comprising the top of providing a second card set comprising a plurality of cards, each card of said second set corresponding to one of said cards of said first set, said cards of said second set indicating the fewest number of coins which sum said monetary values indicated by the corresponding cards of the first set.

15. A method according to claim 14 further comprising the steps of placing said card sets on said game board face down prior to the step of displaying one of said cards, and displaying the corresponding answer card after the step of placing coins in said recesses.

* * * * *